US012567711B2

(12) United States Patent
Taira et al.

(10) Patent No.: US 12,567,711 B2
(45) Date of Patent: Mar. 3, 2026

(54) LASER DEVICE AND PULSE WIDTH-CHANGING METHOD

(71) Applicant: INTER-UNIVERSITY RESEARCH INSTITUTE CORPORATION NATIONAL INSTITUTES OF NATURAL SCIENCES, Mitaka (JP)

(72) Inventors: Takunori Taira, Okazaki (JP); Taisuke Kawasaki, Okazaki (JP); Vincent Yahia, Okazaki (JP)

(73) Assignee: INTER-UNIVERSITY RESEARCH INSTITUTE CORPORATION NATIONAL INSTITUTES OF NATURAL SCIENCES, Mitaka (JP)

( * ) Notice: Subject to any disclaimer, the term of this patent is extended or adjusted under 35 U.S.C. 154(b) by 977 days.

(21) Appl. No.: 17/761,268

(22) PCT Filed: Sep. 17, 2020

(86) PCT No.: PCT/JP2020/035306
§ 371 (c)(1),
(2) Date: Mar. 17, 2022

(87) PCT Pub. No.: WO2021/054401
PCT Pub. Date: Mar. 25, 2021

(65) Prior Publication Data
US 2022/0376454 A1 Nov. 24, 2022

(30) Foreign Application Priority Data
Sep. 19, 2019 (JP) ................................. 2019-170783

(51) Int. Cl.
*H01S 3/00* (2006.01)
*H01S 3/094* (2006.01)
(Continued)

(52) U.S. Cl.
CPC .......... *H01S 3/0057* (2013.01); *H01S 3/0085* (2013.01); *H01S 3/094076* (2013.01); (Continued)

(58) Field of Classification Search
CPC ................. H01S 3/0057; H01S 3/0085; H01S 3/094076; H01S 3/1024; H01S 3/0602; (Continued)

(56) References Cited

U.S. PATENT DOCUMENTS 5,235,606 A 8/1993 Mourou et al.
9,160,136 B1 * 10/2015 Bishop .................. H01S 3/2333
(Continued)

FOREIGN PATENT DOCUMENTS

CN 103022862 A 4/2013
CN 109616860 A 4/2019
(Continued)

OTHER PUBLICATIONS

International Preliminary Report on Patentability mailed Mar. 31, 2022 for PCT/JP2020/035306.

*Primary Examiner* — Xinning(Tom) Niu
(74) *Attorney, Agent, or Firm* — Faegre Drinker Biddle & Reath LLP

(57) ABSTRACT

A laser device according to one embodiment includes a laser light source configured to output pulsed laser light L1 and a pulse width control unit configured to amplify the pulsed laser light output from the laser light source, change a pulse width of the pulsed laser light, and output the pulsed laser light. The pulse width control unit includes a first laser amplifier configured to amplify the pulsed laser light and a pulse waveform manipulation unit disposed between the first laser amplifier and the laser light source and configured to manipulate a pulse waveform of the pulsed laser light.

26 Claims, 8 Drawing Sheets

(51) Int. Cl.
  *H01S 3/102*    (2006.01)
  *H01S 3/06*    (2006.01)
  *H01S 3/0941*    (2006.01)

(52) U.S. Cl.
  CPC .......... *H01S 3/1024* (2013.01); *H01S 3/0602*
      (2013.01); *H01S 3/0941* (2013.01); *H01S*
                    *2301/08* (2013.01)

(58) Field of Classification Search
  CPC ............... H01S 3/0941; H01S 2301/08; H01S
        3/10061; H01S 3/1001; H01S 3/2333;
                              H01S 3/0627
  See application file for complete search history.

(56)              References Cited

U.S. PATENT DOCUMENTS

| | | | |
|---|---|---|---|
| 2002/0041736 A1 | 4/2002 | LoCasclo et al. | |
| 2009/0279167 A1 | 11/2009 | Vigroux et al. | |
| 2010/0177794 A1* | 7/2010 | Peng ................. | B23K 26/0624 |
| | | | 372/25 |
| 2010/0272132 A1* | 10/2010 | Yamazoe ............. | H01S 3/1103 |
| | | | 372/18 |
| 2010/0278199 A1 | 11/2010 | Maryashin et al. | |

| | | | |
|---|---|---|---|
| 2018/0123314 A1 | 5/2018 | Hunter, Jr. | |
| 2019/0173254 A1 | 6/2019 | Trépanier et al. | |
| 2020/0036155 A1* | 1/2020 | Noach ................... | H01S 3/1118 |

FOREIGN PATENT DOCUMENTS

| | | |
|---|---|---|
| JP | H11-261134 A | 9/1999 |
| JP | 2002-062553 A | 2/2002 |
| JP | 2003-518440 A | 6/2003 |
| JP | 2003-536266 A | 12/2003 |
| JP | 2004-337925 A | 12/2004 |
| JP | 2007-532005 A | 11/2007 |
| JP | 2008-270549 A | 11/2008 |
| JP | 2012-216769 A | 11/2012 |
| JP | 2015-079873 A | 4/2015 |
| JP | 2016-518024 A | 6/2016 |
| JP | 2018-098449 A | 6/2018 |
| JP | 6793893 B1 | 12/2020 |
| KR | 10-2015-0112651 A | 10/2015 |
| WO | WO-01/47659 A1 | 7/2001 |
| WO | WO-01/98016 A2 | 12/2001 |
| WO | WO-2005/094379 A2 | 10/2005 |
| WO | WO-2009/119585 A1 | 10/2009 |
| WO | WO-2014/118925 A1 | 8/2014 |
| WO | WO-2014/162209 A2 | 10/2014 |
| WO | WO-2018/110222 A1 | 6/2018 |
| WO | WO-2021/186508 A1 | 9/2021 |

* cited by examiner

LASER DEVICE AND PULSE WIDTH-CHANGING METHOD

TECHNICAL FIELD

The present invention relates to a laser device and a pulse width-changing method.

BACKGROUND ART

As a technique for controlling the pulse width of pulsed laser light, the technique described in Patent Literature 1 is known. In Patent Literature 1, pulsed laser light is amplified after the pulse width is temporarily extended by making the pulsed laser light have a time difference for each wavelength using a lens and an optical fiber. Thereafter, the respective wavelengths distributed to the space are collected again at the same time using a lens and a diffraction grating to compress the pulse.

CITATION LIST

Patent Literature

Patent Literature 1: U.S. Pat. No. 5,235,606

SUMMARY OF INVENTION

Technical Problem

The technique described in Patent Literature 1 requires components for extending a pulsed laser light (in Patent Literature 1, a lens and an optical fiber) and components for compressing a pulse width after amplification (in Patent Literature 1, two diffraction gratings). Furthermore, since the laser device uses dispersion, the device size increases.

Accordingly, an object of the present invention is to provide a laser device and a pulse width-changing method that can reduce the device size and change the pulse width.

Solution to Problem

A laser device according to one aspect of the present invention includes a laser light source configured to output pulsed laser light and a pulse width control unit configured to amplify the pulsed laser light output from the laser light source, change a pulse width of the pulsed laser light, and output the pulsed laser light. The pulse width control unit includes a first laser amplifier configured to amplify the pulsed laser light and a pulse waveform manipulation unit disposed between the first laser amplifier and the laser light source and configured to manipulate a pulse waveform of the pulsed laser light.

In the laser device, after the waveform of pulsed laser light is manipulated, the pulsed laser light is amplified by the first laser amplifier. This makes it possible to change the pulse width.

The pulse waveform manipulation unit may be configured to adjust at least one of a rise time and a fall time of the pulsed laser light. This makes it possible to change the pulse waveform.

The pulse waveform manipulation unit may be configured to adjust tr/tf in a range of more than 0 and less than 1 when a rise time of the pulsed laser light is tr and a fall time of the pulsed laser light is tf. This allows the laser device to output the pulsed laser light having a pulse width shorter than the pulse width of the pulsed laser light output from the laser light source.

The pulse waveform manipulation unit may be configured to adjust tr/tf to less than 0.85.

The pulse waveform manipulation unit may be configured to manipulate a waveform of the pulsed laser light while maintaining a pulse width of the pulsed laser light.

The pulse waveform manipulation unit may have a saturable absorber. The pulse waveform manipulation unit may have a diffraction grating pair. The pulse waveform manipulation unit may have a chirped diffraction grating.

The pulse waveform manipulation unit may include a second laser amplifier. The second laser amplifier may include a gain medium and a control unit that controls a supply state of excitation light to the gain medium. The control unit may control the supply state so as to manipulate the waveform of the pulsed laser light.

The control unit may switch between supplying the excitation light to the gain medium after the pulsed laser light is input to the gain medium and stopping a supply of the excitation light before the pulsed laser light is input to the gain medium.

The pulse waveform manipulation unit may include a second laser amplifier, and the second laser amplifier may include a gain medium, a pulse energy adjustment unit configured to change energy of the pulsed laser light input to the gain medium, and an excitation energy adjustment unit configured to change energy of excitation light to the gain medium.

The laser light source may output multi-mode pulsed laser light. The pulse width control unit may include a mode selection unit that selects one of multi-modes between the laser light source and the pulse waveform manipulation unit.

A pulse width-changing method according to another aspect of the present invention includes an output step of outputting pulsed laser light from a laser light source and a pulse width control step of amplifying the pulsed laser light, changing a pulse width of the pulsed laser light, and outputting the pulsed laser light. The pulse width control step includes an amplification step of amplifying the pulsed laser light output from the laser light source and a pulse waveform manipulation step of manipulating a waveform of the pulsed laser light before the amplification step.

In the above method, after the waveform of pulsed laser light is manipulated, the pulsed laser light is amplified by the first laser amplifier. This makes it possible to control the pulse width.

In the pulse waveform manipulation step, a waveform of the pulsed laser light may be manipulated by adjusting at least one of a rise time and a fall time of the pulsed laser light.

In the pulse waveform manipulation step, tr/tf may be adjusted in a range of more than 0 and less than 1 when a rise time of the pulsed laser light is tr and a fall time of the pulsed laser light is tf.

In the pulse waveform manipulation step, tr/tf may be adjusted to less than 0.85.

Advantageous Effects of Invention

The present invention can provide a laser device and a pulse width-changing method that can reduce the device size and change the pulse width.

DESCRIPTION OF EMBODIMENTS

Figure 1:
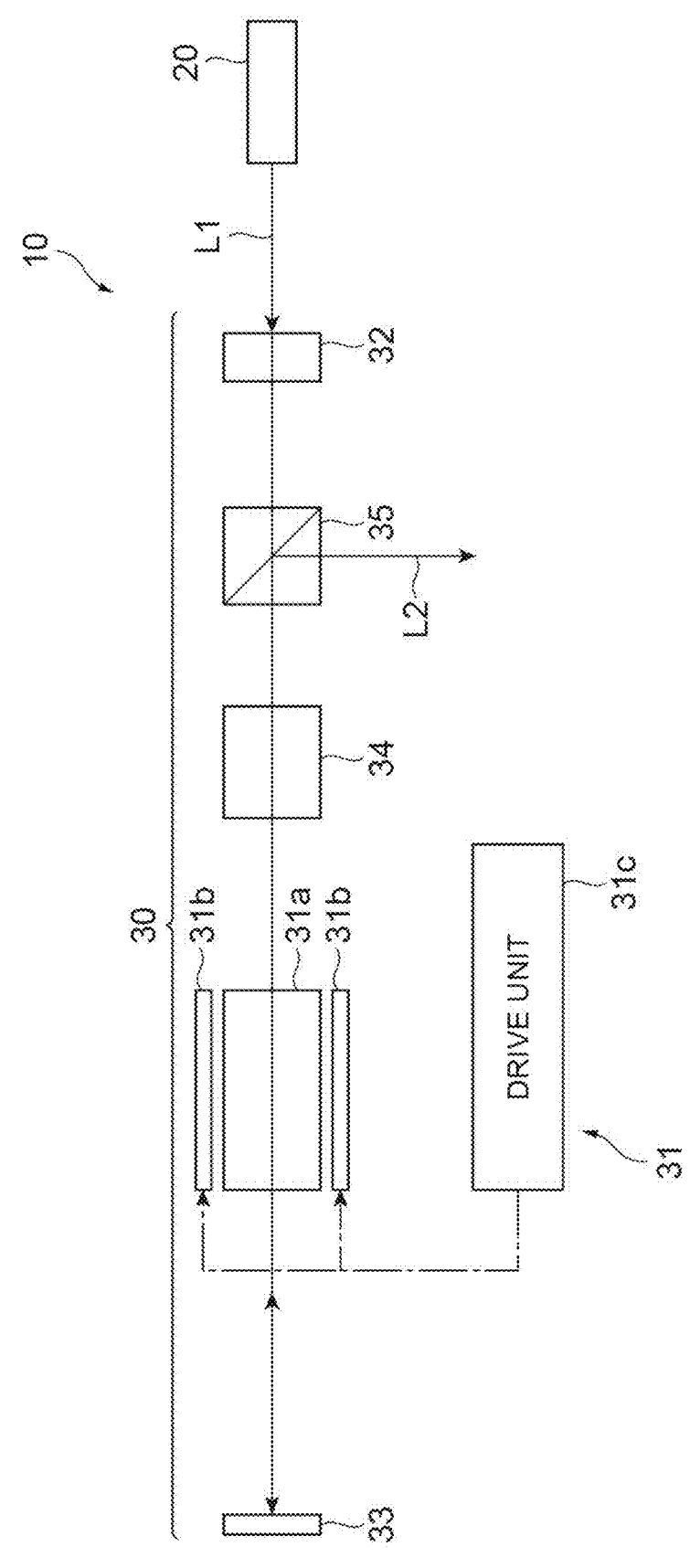
FIG. 1 is a view illustrating a schematic configuration of a laser device according to an embodiment.

Hereinafter, embodiments of the present invention will be described in detail with reference to the accompanying drawings. In the description of the drawings, the same or equivalent elements are denoted by the same reference numerals, and redundant descriptions are omitted. The dimensional ratios in the drawings do not necessarily coincide with those in the description.

As illustrated in FIG. 1, a laser device 10 according to the present embodiment includes a laser light source 20 and a pulse width control unit 30.

The laser light source 20 outputs a pulsed laser light L1. The pulse width of the pulsed laser light L1 output from the laser light source 20 is, for example, 0.1 ps to 10 ns or 1 ps to 1 ns. The wavelength of the pulsed laser light L1 is, for example, 157 nm to 3.4 μm or 650 nm to 2.1 μm. The laser light source 20 may be, for example, a laser oscillator. An example of the laser light source 20 is a passive Q-switched microchip laser. In the present specification, the pulse width is a full width at half maximum.

The pulse width control unit 30 amplifies the pulsed laser light L1, changes the pulse width, and outputs the resultant pulsed laser light. The pulse width control unit 30 includes a laser amplifier (first laser amplifier) 31 and a pulse waveform manipulation unit 32. As illustrated in FIG. 1, the pulse width control unit 30 may include a termination mirror 33, a polarization rotation element 34, and a polarization beam splitter 35. The present embodiment will exemplify a mode including the termination mirror 33, the polarization rotation element 34, and the polarization beam splitter 35.

The laser amplifier 31 includes an amplification gain medium 31a, an excitation light supply unit 31b, and a drive unit (a control unit and an excitation energy adjustment unit) 31c.

The amplification gain medium 31a is an optical component that is disposed on the optical path of the pulsed laser light L1 and amplifies the pulsed laser light L1. The amplification gain medium 31a may be formed of a material that can amplify the pulsed laser light L1. Examples of the material of the amplification gain medium 31a include Nd: YAG (neodymium-doped yttrium aluminum garnet), Nd: YVO₄ (neodymium-doped YVO₄), Yb: YAG (ytterbium-doped YAG), Yb: glass (ytterbium-doped glass), and Er: YAG (erbium-doped YAG). The shape of the amplification gain medium 31a is not limited and is, for example, a rod shape or a plate shape.

The excitation light supply unit 31b includes at least one light source that supplies excitation light for exciting the amplification gain medium 31a to the amplification gain medium 31a. An example of the light source of the excitation light supply unit 31b is a laser diode (LD). FIG. 1 illustrates a case of side surface excitation.

The drive unit 31c is electrically connected to the excitation light supply unit 31b. The drive unit 31c drives the excitation light supply unit 31b and controls the supply state (for example, the energy of excitation light, ON/OFF of the supply of excitation light, and the like) of excitation light.

The method of exciting the amplification gain medium 31a is not limited to the above-described example. The excitation light supply unit 31b and the drive unit 31c may be directly connected (or configured as one device), and excitation light may be supplied from the excitation light supply unit 31b to the amplification gain medium 31a through a fiber. Instead of the side surface excitation as illustrated in FIG. 1, for example, end surface excitation may be performed according to the configuration of the laser device 10. The wavelength of excitation light may be any wavelength that can excite the amplification gain medium 31a.

The termination mirror 33 is disposed on the optical path of the pulsed laser light L1 on the side opposite of the amplification gain medium 31a to the laser light source 20. The termination mirror 33 reflects the pulsed laser light L1 toward the amplification gain medium 31a.

The polarization rotation element 34 is disposed on the optical path of the pulsed laser light L1 between the amplification gain medium 31a and the polarization beam splitter 35. The polarization rotation element 34 rotates the polarization direction of the pulsed laser light L1 that has passed through the polarization beam splitter 35 and the pulsed laser light L1 that has been reflected by the termination mirror 33 and passed through the amplification gain medium 31a. The polarization rotation element 34 may rotate the polarization of the pulsed laser light L1 such that the pulsed laser light L1 reflected and returned by the termination mirror 33 is reflected by the polarization beam splitter 35. An example of the polarization rotation element 34 is a Faraday rotation element.

The polarization beam splitter 35 is disposed on the optical path of the pulsed laser light L1 between the laser light source 20 and the amplification gain medium 31a. The polarization beam splitter 35 transmits the pulsed laser light L1 output from the laser light source 20 and reflects the pulsed laser light L1 whose polarization direction has been rotated by the polarization rotation element 34. The pulsed laser light L1 reflected by the polarization beam splitter 35 is a pulsed laser light L2 output from the laser device 10.

The pulse waveform manipulation unit 32 is disposed on the optical path of the pulsed laser light L1 between the laser light source 20 and the laser amplifier 31 (specifically, the amplification gain medium 31a). In the present embodiment, since the laser device 10 includes the polarization beam splitter 35, the pulse waveform manipulation unit 32 is disposed between the laser light source 20 and the polarization beam splitter 35.

The pulse waveform manipulation unit 32 is a waveform manipulation mechanism that manipulates the pulse waveform of the pulsed laser light L1 output from the laser light source 20. For example, the pulse waveform manipulation unit 32 manipulates the pulse waveform so as to substantially maintain the pulse width. Manipulating the pulse waveform so as to substantially maintain the pulse width means that slight variation in pulse width can be allowed in the manipulation of the pulse waveform.

The pulse waveform manipulation unit 32 is configured to be able to adjust at least a pulse rise time or a pulse fall time of the pulse waveform of the pulsed laser light L1. The definitions of the rise time and the fall time may be definitions usually used in the technical field related to pulsed laser light. For example, the time taken for the intensity of pulsed laser light to increase from 10% to 90% with respect to the maximum intensity of the light may be defined as the rise time, and the time taken for the intensity to decrease from 90% to 10% with respect to the maximum intensity may be defined as the fall time.

When the rise time is tr and the fall time is tf, the pulse waveform manipulation unit 32 may manipulate the pulse waveform such that, for example, tr/tf is more than 0. For example, the pulse waveform manipulation unit 32 may manipulate the pulse waveform such that tr/tf is more than 0 and less than 1. For example, the pulse waveform manipulation unit 32 may manipulate the pulse waveform such that tr/tf is less than 0.85.

The pulse waveform manipulation unit 32 is not limited as long as it can manipulate the pulse waveform.

For example, the pulse waveform manipulation unit 32 may be configured to have a function of having a high gain at the head of the pulse and rapidly decreasing the gain after the middle of the pulse.

Alternatively, for example, the pulse waveform manipulation unit 32 may be configured to have a function of increasing the contrast at the rise time by rapidly saturating the loss in the first half of the pulse and rapidly recovering the loss in the second half of the pulse.

An example of the pulse waveform manipulation unit 32 is a saturable absorber. Examples of the saturable absorber include Cr: YAG and a saturable absorber mirror.

Figure 2:
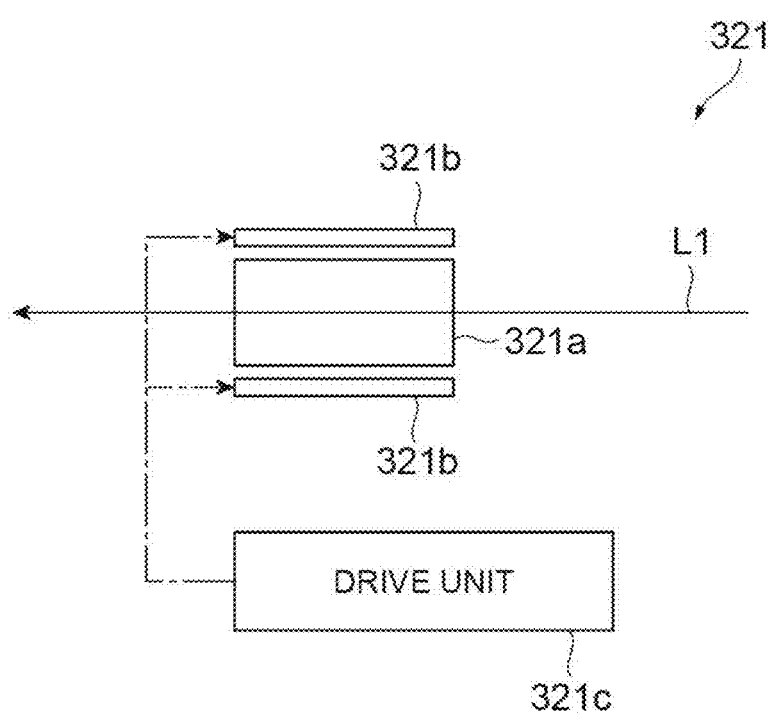
FIG. 2 is a schematic diagram illustrating an example of a pulse waveform manipulation unit (pulse waveform manipulation unit) of the laser device illustrated in FIG. 1.

The pulse waveform manipulation unit 32 may be the laser amplifier (second laser amplifier) 321 illustrated in FIG. 2. The laser amplifier 321 includes a gain medium 321a, an excitation light supply unit 321b, and a drive unit (control unit) 321c.

An example of the material of the gain medium 321a can be similar to that of the amplification gain medium 31a. The material of the gain medium 321a may be the same as or different from the material of the amplification gain medium 31a.

The excitation light supply unit 321b includes at least one light source that supplies excitation light to the gain medium 321a. An example of the light source of the excitation light supply unit 32b is an LD. FIG. 2 illustrates a case of side excitation. However, the excitation method is not limited to side excitation and may be end excitation. The wavelength of excitation light may be any wavelength that can excite the gain medium 321a.

The drive unit 321c is electrically connected to the excitation light supply unit 32b. The drive unit 321c drives the excitation light supply unit 321b and controls the supply state (for example, the energy of excitation light, ON/OFF of the supply of excitation light, and the like) of excitation light.

Similarly to the case of the laser amplifier 321, the method of exciting the amplification gain medium 31a in the laser amplifier 31 is not limited to the above-described excitation method.

When the pulse waveform manipulation unit 32 is the laser amplifier 321, the waveform of the pulsed laser light L1 is manipulated by controlling the supply state of excitation light.

For example, the drive unit 321c switches between supplying excitation light to the gain medium 321a after the pulsed laser light L1 is input to the gain medium 311a and stopping the supply of excitation light before the pulsed laser light L1 is input to the gain medium 311a. As a result, since the gain of the pulsed laser light L1 can be controlled, the pulse waveform can be manipulated.

The drive unit 321c is electrically connected to, for example, the laser light source 20, and the drive unit 321c may control the laser light source 20 or the laser device 10 may separately include a control device that controls the drive unit 321c and the laser light source 20. In this case, for example, as described above, it is easy to control the supply state of excitation light according to the input state of the pulsed laser light L1 to the gain medium 311a.

Figure 3:
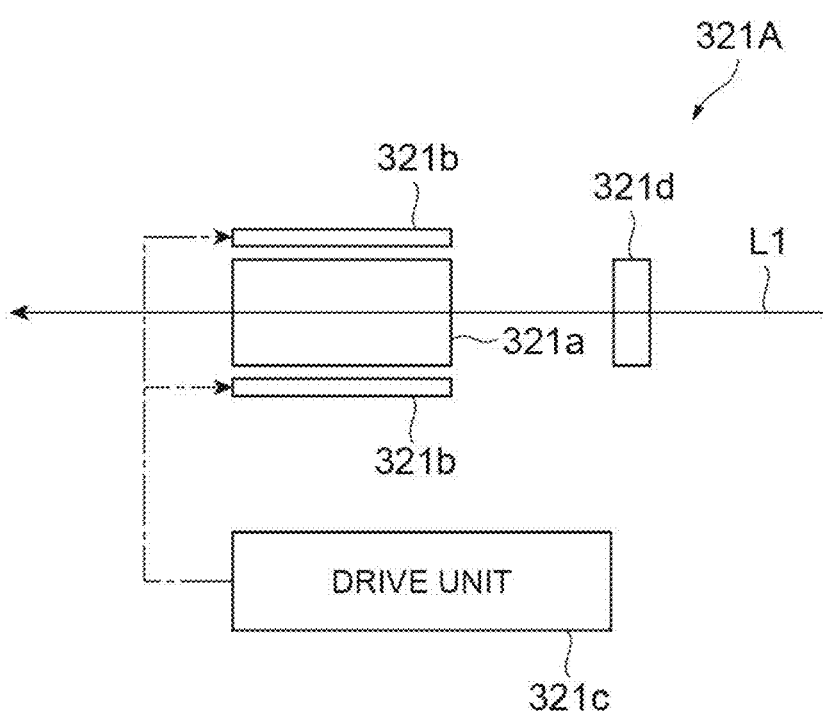
FIG. 3 is a schematic diagram illustrating another example of the pulse waveform manipulation unit (pulse waveform manipulation unit) of the laser device illustrated in FIG. 1.

The pulse waveform manipulation unit 32 may be a laser amplifier 321A illustrated in FIG. 3. The laser amplifier 321A is different from the laser amplifier 321 in FIG. 2 in that a pulse energy adjustment unit 321d that changes the energy of the pulsed laser light L1 input to the gain medium 321a is disposed in a preceding stage (input side of the pulsed laser light L1) of the gain medium 321a.

An example of the pulse energy adjustment unit 321d is an attenuator. In the laser amplifier 321A, the drive unit 321c may manipulate the pulse waveform by adjusting the energy of excitation light according to the pulse energy adjusted by the pulse energy adjustment unit 321d.

In this case, the traveling direction of the pulsed laser light L1 is defined as the z direction, and the pulse waveform of the pulsed laser light L1 is expressed by formula (1) given below.

[Formula 1]

$$f(z)=1/(\sqrt{2\pi}\sigma \cdot z)\cdot \exp(-(lnz-\mu)^2/2\sigma^2) \qquad (1)$$

In Formula (1), $\sigma$ and $\mu$ are fitting coefficients.

Figure 4:
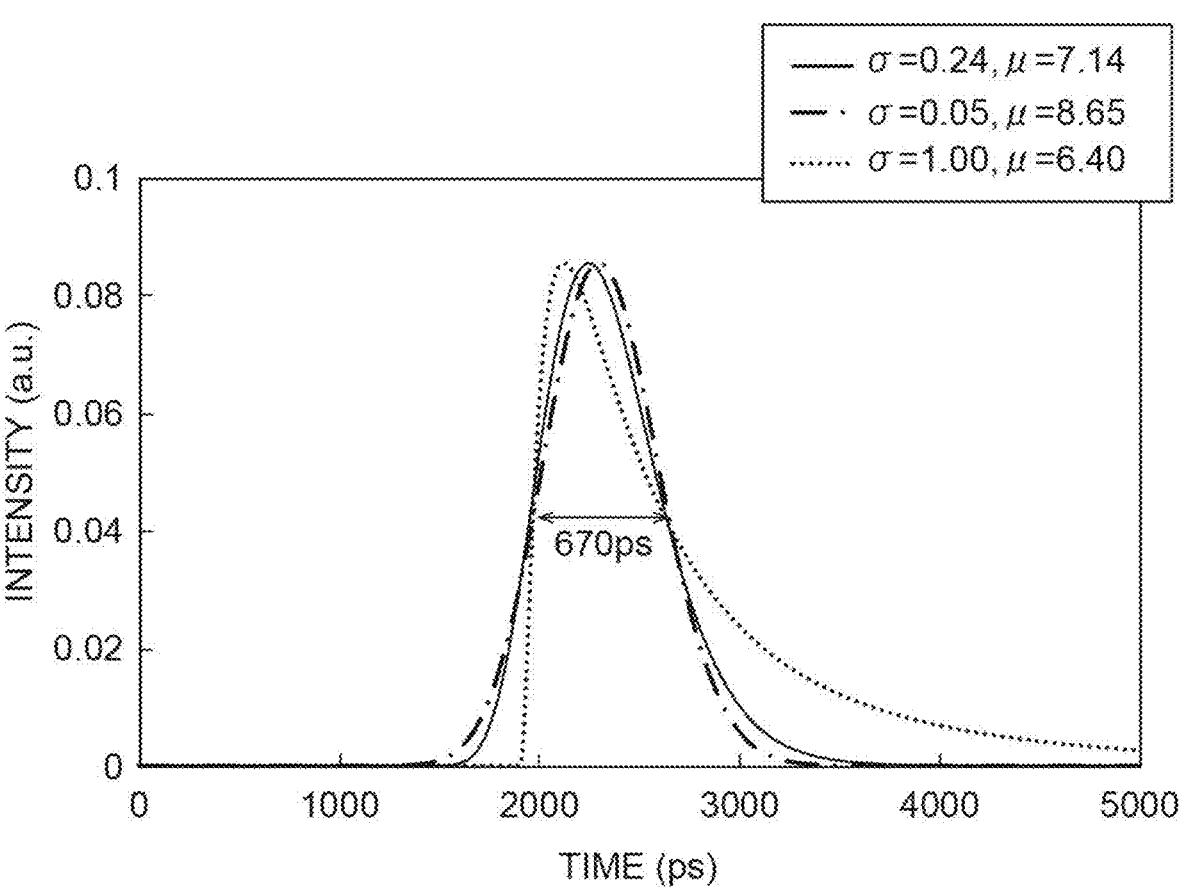
FIG. 4 is a graph for explaining an example of a pulse waveform.

FIG. 4 is a graph illustrating an example of the pulse waveform expressed by formula (1). Referring to FIG. 4, the horizontal axis represents time, and the vertical axis represents intensity (arbitrary unit: a.u.). Since the traveling direction of the pulsed laser light L1 is the z direction, z in formula (1) is equivalent to the time t, and FIG. 4 illustrates a pulse waveform in which z in formula (1) is replaced with the time t. Referring to FIG. 4, the left side is the head side of the pulsed laser light L1. In formula (1), $\sigma$ and $\mu$ take arbitrary values in the pulse waveform of the pulsed laser light L1 output from the laser light source 20. FIG. 4 illustrates a case where the pulsed laser light L1 having a pulse width of 670 ps is output from laser light source 20.

Manipulating a pulse waveform by the pulse waveform manipulation unit 32 corresponds to forming a pulse waveform with different $\sigma$ in formula (1) by the pulse waveform manipulation unit 32. For example, as illustrated in FIG. 4, by setting $\sigma$ to be more than 0.05, a pulse waveform with a fast pulse rise time can be obtained.

A pulse width-changing method using the laser device 10 will be described.

First, the pulsed laser light L1 is output from the laser light source 20 (output step). Next, the pulsed laser light L1 is amplified, and the pulse width of the pulsed laser light L1 is changed. The resultant light is then output from the laser device 10 (pulse width control step). The pulse width control step will be specifically described.

In the pulse width control step, the pulse waveform manipulation unit 32 manipulates the pulsed laser light L1 output from the laser light source 20 (pulse waveform manipulation step).

The pulsed laser light L1 whose pulse waveform has been manipulated sequentially passes through the polarization beam splitter 35 and the polarization rotation element 34 and is input to the laser amplifier 31 (specifically, the amplification gain medium 31a). When the pulsed laser light L1 passes through the polarization rotation element 34, the polarization direction of the pulsed laser light L1 is rotated. The pulsed laser light L1 input to the laser amplifier 31 is amplified by the laser amplifier 31 (amplification step). In the laser device 10 illustrated in FIG. 1, the pulsed laser light L1 having passed through the laser amplifier 31 is reflected by the termination mirror 33. The pulsed laser light L1 reflected by the termination mirror 33 passes through the laser amplifier again. Therefore, in the amplification step in the present embodiment, the pulsed laser light L1 is amplified twice by the amplification gain medium 31a.

The pulsed laser light L1 reflected by the termination mirror 33 and passing through the laser amplifier 31 again passes through the polarization rotation element 34 and then is input to the polarization beam splitter 35. The polarization of the pulsed laser light L1 is further rotated by passing through the polarization rotation element 34. As a result, the pulsed laser light L1 input from the polarization rotation element 34 side to the polarization beam splitter 35 is reflected by the polarization beam splitter 35 and output as the pulsed laser light L2 from the laser device 10.

As described above, in the laser device 10 and the pulse width-changing method using the same, the pulse waveform of the pulsed laser light L1 output from the laser light source 20 is manipulated before being input to the laser amplifier 31. The pulse width can be adjusted by amplifying, with the laser amplifier 31, the pulsed laser light L1 whose pulse waveform has been manipulated in this manner.

Figure 5:
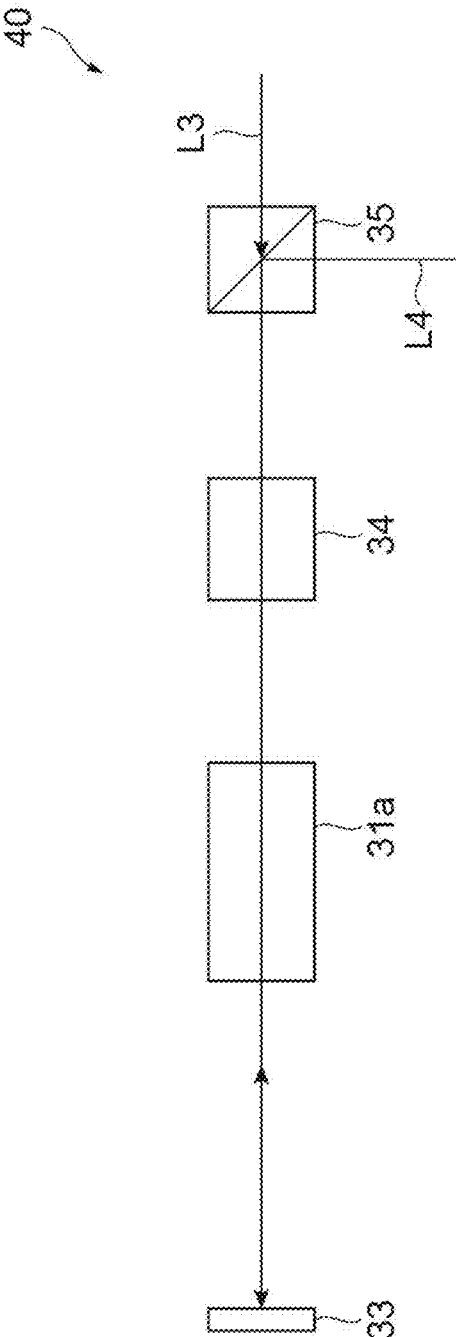
FIG. 5 is a diagram illustrating a schematic configuration of a simulation model.

This point will be specifically described with reference to a simulation result. FIG. 5 is a diagram illustrating a simulation model 40. The simulation model 40 is a model corresponding to the configuration illustrated in FIG. 1 and includes the polarization beam splitter 35, the polarization rotation element 34, the amplification gain medium 31a, and the termination mirror 33 as illustrated in FIG. 5. The arrangement of the polarization beam splitter 35, the polarization rotation element 34, the amplification gain medium 31a, and the termination mirror 33 is similar to that illustrated in FIG. 1. In the simulation, it is assumed that incident pulsed light L3 is input to the polarization beam splitter 35. The incident pulsed light L3 corresponds to the pulsed laser light L1 output from the pulse waveform manipulation unit 32 in FIG. 1 and input to the polarization beam splitter 35.

The conditions of the incident pulsed light L3 were as follows:

Energy: 5 mJ
Beam diameter (diameter of incident pulsed light L3): 2.4 mm
Pulse width: 670 ps
Nd: YAG rod is assumed as the amplification gain medium 31a. The conditions of the Nd: YAG rod were as follows:
Rod length: 126 mm
Rod diameter (diameter): 5 mm
Doping rate: 1 at. %
Saturation fluence of Nd: YAG: 667 mJ/cm$^2$
Fluorescent life time of Nd: YAG: 230 µs
The excitation conditions of the Nd: YAG rod were as follows:
Excitation power: 6 kW
Excitation pulse width: 250 µs
Further, the following conditions were set:
Stokes efficiency: 0.76
Quantum efficiency at 1 at. %: 0.8
Storage efficiency with excitation light having a pulse width of 250 µs: 0.66

In the simulation, when the incident pulsed light L3 is input to the polarization beam splitter 35 of the simulation model 40, the pulse width of output pulsed light L4, which is amplified by the amplification gain medium 31a in the same manner as the laser device 10 illustrated in FIG. 1 and output from the polarization beam splitter 35, is calculated. Furthermore, the rate of change of pulse width (Tout/Tin) was calculated with the pulse width of the incident pulsed light L3 as Tin and the pulse width of the output pulsed light L4 as Tout.

In a simulation, the rate of change (Tout/Tin) was calculated while the ratio (tr/tf) of the rise time tr to the pulse fall time tf of the incident pulsed light L3 was changed. The rise time tr is the time taken for the intensity of the pulsed laser light L1 to increase from 10% to 90% with respect to the maximum intensity of the light, and the fall time tf was the time taken for the intensity to decrease from 90% to 10% with respect to the maximum intensity.

Figure 6:
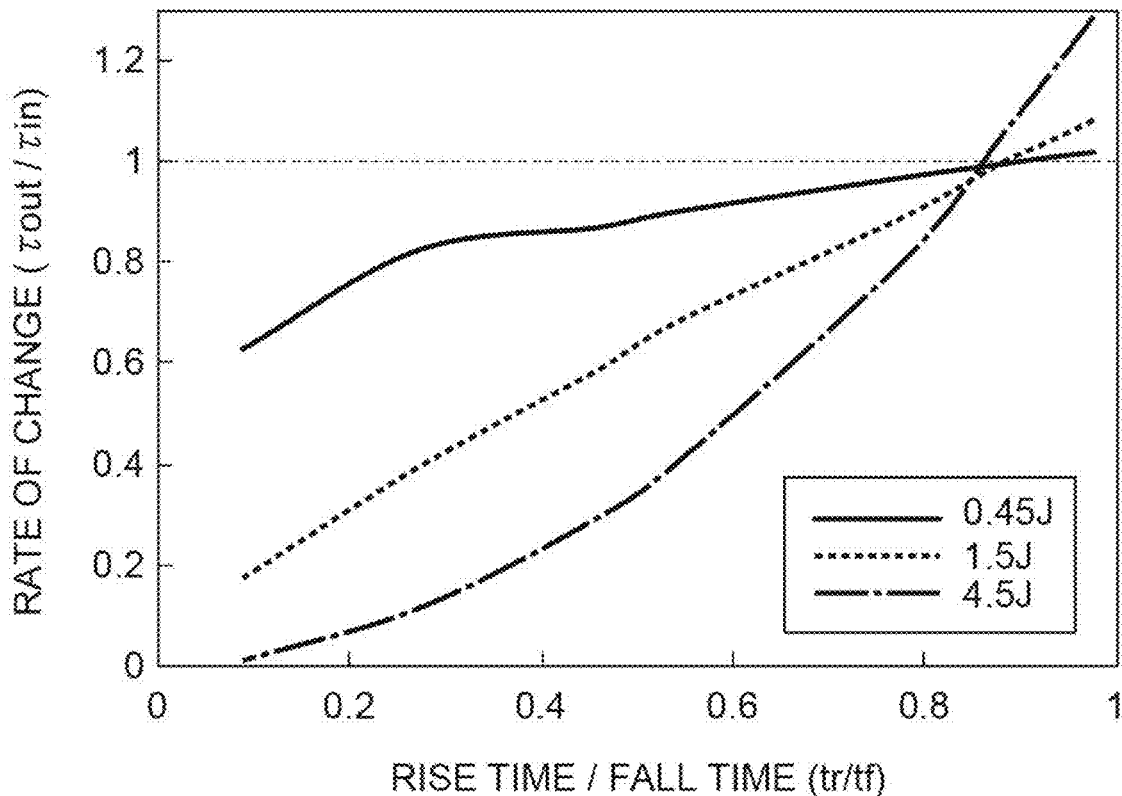
FIG. 6 is a graph illustrating a simulation result.

FIG. 6 is a diagram illustrating a simulation result. Referring to FIG. 6, the horizontal axis represents the ratio (tr/tf) of the rise time tr to the pulse fall time tf, and the vertical axis represents the rate of change (Tout/Tin). FIG. 6 illustrates the results obtained when the excitation energy of the amplification gain medium 31a is 0.45 J, 1.5 J, and 4.5 J.

As illustrated in FIG. 6, it can be understood that the rate of change (Tout/Tin) changes as the ratio (tr/tf) changes. That is, it can be understood that the pulse width of the output pulsed light L4, which is the pulsed laser light after amplification, changes by manipulating the waveform of the incident pulsed light L3.

More specifically, it may be understood that the pulse width extends (the pulse extends) when the ratio (tr/tf) is 1 or more, whereas the rate of change decreases as the ratio (tr/tf) decreases from 1. If the ratio (tr/tf) is less than 0.85, the rate of change is less than 1 (the pulse is compressed). The reason why the rate of change decreases as the ratio (tr/tf) decreases from 1 is considered that when such a pulse is incident on the amplification gain medium, stimulated emission occurs strongly at the head of the pulse, and a gain shortage occurs on the rear side of the pulse.

Furthermore, it can be understood that the pulse width of the pulsed laser light after amplification (the output pulsed light L4 in FIG. 5) also changes by changing the excitation energy of the amplification gain medium 31a. More specifically, the stronger the excitation energy, the larger the change amount of pulse width.

In the laser device 10 and the pulse width-changing method using the same, the pulse width of the pulsed laser light L1 to be output can be controlled by manipulating the pulse waveform of the pulsed laser light L1 before the pulsed laser light L1 enters the laser amplifier 31.

Accordingly, for example, it is possible to reduce the size of the laser device 10 as compared with a case where the pulse width is reduced by once extending the pulsed laser light in front of the amplification gain medium and then compressing again the pulsed laser light that has passed through the amplification gain medium.

Furthermore, in a mode in which a mechanism (or element) having an amplification effect is used as the pulse waveform manipulation unit 32 like the laser amplifiers 321 and 321A illustrated in, for example, FIGS. 2 and 3, the pulsed laser light L1 can be amplified while the pulse waveform is manipulated. As a result, the intensity of the pulsed laser light (pulsed laser light L2 in FIG. 1), which is the output pulsed light, can be further increased.

Furthermore, for example, the pulse can be compressed by setting the ratio (tr/tf) to less than 0.85 (particularly, 0.1 or less). For example, when the pulse width of the pulsed laser light L1 output from the laser light source 20 is 10 ps to 1000 ps, the pulsed laser light L2 having a pulse width of 200 fs to 20 ps can be output from the laser device 10. Even a pulse width of 200 fs to 20 ps is effective for laser processing. Accordingly, the laser device 10 can have a configuration that can output the pulsed laser light L2 having a pulse width effective for laser processing while achieving miniaturization. As described above, as the excitation energy of the amplification gain medium 31a is changed, the pulse width of the pulsed laser light after amplification (the output pulsed light L4 in FIG. 5) also changes. Accordingly, when the pulse width is adjusted, the excitation energy is preferably high. For example, when the excitation energy is higher (for example, 18 kW or more), as described above, the pulsed laser light L1 having a pulse width of 10 ps to 1000 ps is more easily output as the pulsed laser light L2 having a pulse width of 200 fs to 20 ps.

(Modification)

Figure 7:
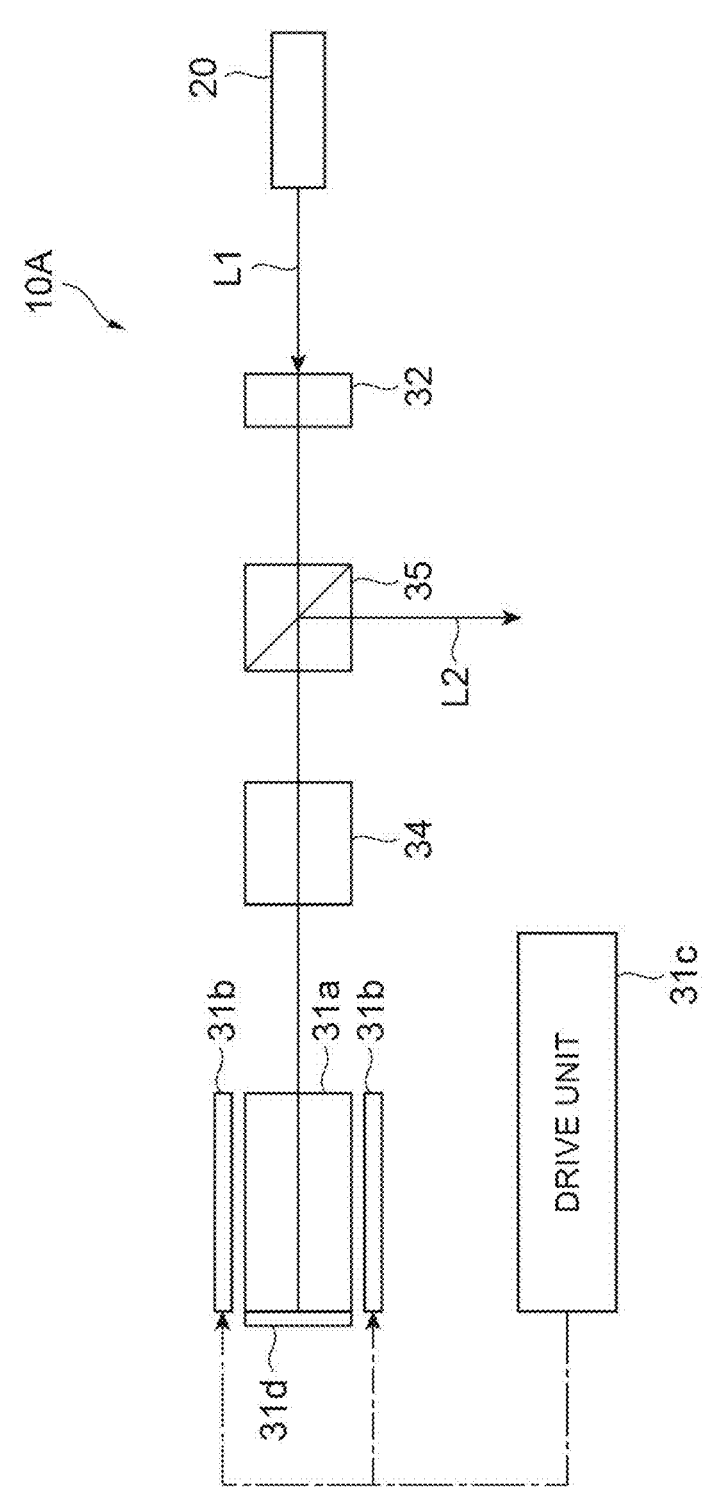
FIG. 7 is a view illustrating a modification of the laser device.

FIG. 7 is a view illustrating the configuration of a laser device 10A according to a modification. The laser device 10A is different from the laser device 10 in that a high-reflection coating film (HR coating film) 31d that reflects the pulsed laser light L1 is provided on an end surface (end surface opposite to the laser light source 20) of the amplification gain medium 31a instead of the termination mirror 33. An example of the high-reflection coating film 31d is a dielectric multilayer film that functions as an HR coat for the pulsed laser light L1. The configuration of the laser device 10A other than this difference is similar to that of the laser device 10.

The laser device 10A includes the pulse waveform manipulation unit 32 between the laser light source 20 and the amplification gain medium 31a. This makes it possible to manipulate the waveform of the pulsed laser light L1 before the pulsed laser light L1 output from the laser light source 20 is input to the amplification gain medium 31a. As a result, the laser device 10A has the same function and effect as those of the laser device 10.

Various embodiments, modifications, and experimental examples of the present invention have been described above. However, the present invention is not limited to the various exemplified embodiments and modifications and is intended to include the scope indicated by the claims and to include all modifications within the meaning and scope equivalent to the claims.

Figure 8:
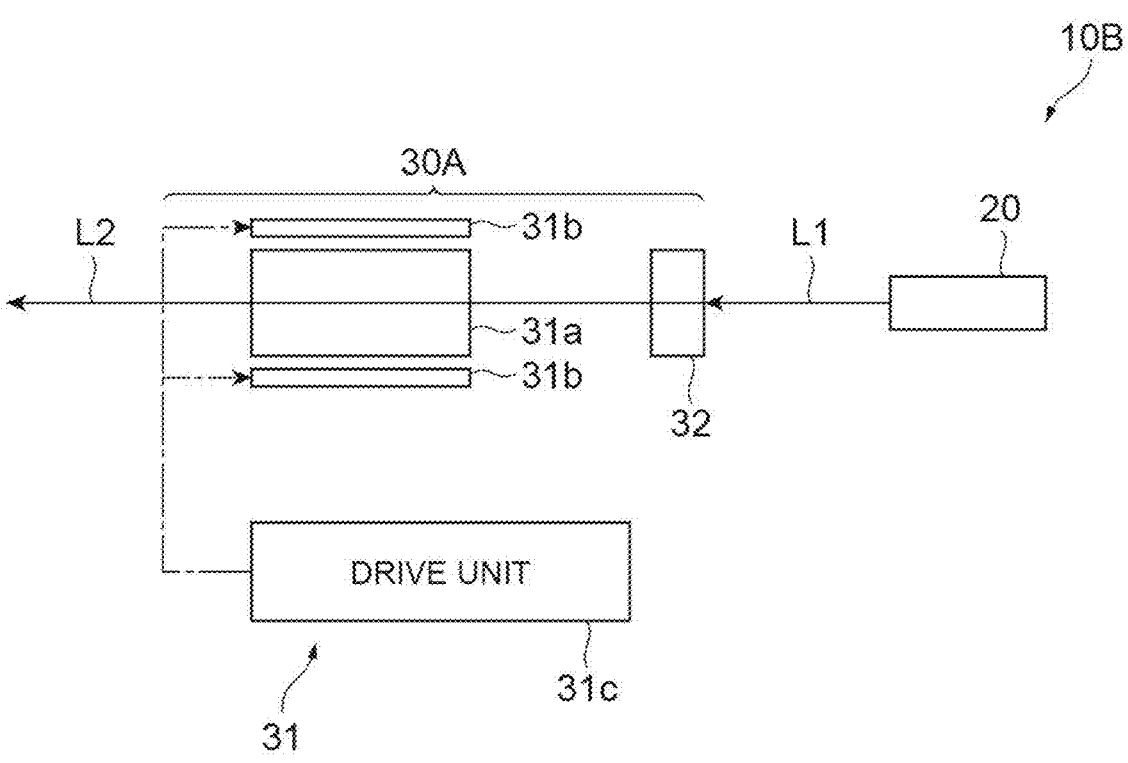
FIG. 8 is a view illustrating another modification of the laser device.

For example, as illustrated in FIG. 8, the pulse width control unit 30 may not include the polarization beam splitter 35, the polarization rotation element 34, and the termination mirror 33 illustrated in FIG. 1. The pulse width control unit 30A of a laser device 10B illustrated in FIG. 8 includes the pulse waveform manipulation unit 32 and the laser amplifier (first laser amplifier) 31. In the laser device 10B, the pulsed laser light L1 output from the laser light source 20 passes through the pulse waveform manipulation unit 32, is once amplified by the laser amplifier 31, and is then output from the laser device 10B. That is, the pulsed laser light (pulsed laser light L2) once amplified and output by the laser amplifier 31 is the output light of the laser device 10B. Also in this case, the waveform of the pulsed laser light L1 is manipulated by the pulse waveform manipulation unit 32 before being input to the laser amplifier 31. Accordingly, the same effects as those of the laser devices 10 and 10A illustrated in FIGS. 1 and 7 are obtained.

The pulse waveform manipulation unit may manipulate the pulse waveform as illustrated in the above embodiment using a diffraction grating pair or a chirped diffraction grating. In the field of laser processing, since pulse compression is usually performed, the pulse waveform manipulation unit may form a diffraction grating pair or a chirped diffraction grating such that the ratio (tr/tf) is less than 0.85.

When the pulsed laser light output from the laser light source is multimode laser light, for example, a mode selection unit for selecting a mode may be provided between the pulse waveform manipulation unit and the laser light source. An example of the mode selection unit is volume bragg grating (VBG).

In a mode in which the pulse waveform manipulation unit includes the second laser amplifier, the second laser amplifier is not limited to the example illustrated in FIGS. 2 and 3.

In a case where the pulse width of the pulsed laser light (in the case of FIG. 1, the pulsed laser light L2) output from the laser device is actively extended, for example, the waveform of the pulsed laser light (in the case of FIG. 1, the pulsed laser light L1) input to the pulse waveform manipulation unit may be manipulated by the pulse waveform manipulation unit such that the ratio (tr/tf) described above becomes 1 or more.

The various embodiments, modifications, and the like described above may be appropriately combined without departing from the gist of the invention.

REFERENCE SIGNS LIST 10, 10A, 10B laser device
20 laser light source
30, 30A pulse width control unit
31 laser amplifier (first laser amplifier)
32 pulse waveform manipulation unit (pulse waveform manipulation unit)
321, 321A laser amplifier (second laser amplifier)
321a gain medium
321c drive unit (control unit)
321d pulse energy adjustment unit
L1 pulsed laser light

The invention claimed is:

1. A laser device comprising:
a laser light source configured to output pulsed laser light; and
a pulse width control unit configured to amplify the pulsed laser light output from the laser light source, change a pulse width of the pulsed laser light, and output the pulsed laser light,
wherein the pulse width control unit includes
a first laser amplifier configured to amplify the pulsed laser light and
a pulse waveform manipulation unit disposed between the first laser amplifier and the laser light source and configured to manipulate a pulse waveform of the pulsed laser light, and,
wherein the pulse waveform manipulation unit includes a second laser amplifier,
the second laser amplifier includes
a gain medium and
a control unit configured to control a supply state of excitation light to the gain medium, and
the control unit controls the supply state so as to manipulate a waveform of the pulsed laser light.

2. The laser device according to claim 1,
wherein the pulse waveform manipulation unit is configured to adjust at least one of a rise time and a fall time of the pulsed laser light.

3. The laser device according to claim 2,
wherein the pulse waveform manipulation unit is configured to adjust tr/tf in a range of more than 0 and less than 1 when a rise time of the pulsed laser light is tr and a fall time of the pulsed laser light is tf.

4. The laser device according to claim 3,
wherein the pulse waveform manipulation unit is configured to adjust tr/tf to less than 0.85.

5. The laser device according to claim 1,
wherein the pulse waveform manipulation unit is configured to manipulate a waveform of the pulsed laser light while maintaining a pulse width of the pulsed laser light.

6. A laser device comprising:
a laser light source configured to output pulsed laser light; and
a pulse width control unit configured to amplify the pulsed laser light output from the laser light source, change a pulse width of the pulsed laser light, and output the pulsed laser light,
wherein the pulse width control unit includes
a first laser amplifier configured to amplify the pulsed laser light and
a pulse waveform manipulation unit disposed between the first laser amplifier and the laser light source and configured to manipulate a pulse waveform of the pulsed laser light, and
wherein the pulse waveform manipulation unit includes a diffraction grating pair.

7. A laser device comprising:
a laser light source configured to output pulsed laser light; and
a pulse width control unit configured to amplify the pulsed laser light output from the laser light source, change a pulse width of the pulsed laser light, and output the pulsed laser light,
wherein the pulse width control unit includes
a first laser amplifier configured to amplify the pulsed laser light and
a pulse waveform manipulation unit disposed between the first laser amplifier and the laser light source and configured to manipulate a pulse waveform of the pulsed laser light, and
wherein the pulse waveform manipulation unit includes a chirped diffraction grating.

8. The laser device according to claim 1,
wherein the control unit switches between supplying the excitation light to the gain medium after the pulsed laser light is input to the gain medium and stopping a supply of the excitation light before the pulsed laser light is input to the gain medium.

9. A laser device comprising:
a laser light source configured to output pulsed laser light; and
a pulse width control unit configured to amplify the pulsed laser light output from the laser light source, change a pulse width of the pulsed laser light, and output the pulsed laser light,
wherein the pulse width control unit includes
a first laser amplifier configured to amplify the pulsed laser light and a pulse waveform manipulation unit disposed between the first laser amplifier and the laser light source and configured to manipulate a pulse waveform of the pulsed laser light, and
wherein the pulse waveform manipulation unit includes a second laser amplifier, and
the second laser amplifier includes
a gain medium,
a pulse energy adjustment unit configured to change energy of the pulsed laser light input to the gain medium, and
an excitation energy adjustment unit configured to change energy of excitation light to the gain medium.

10. A laser device comprising:
a laser light source configured to output pulsed laser light; and
a pulse width control unit configured to amplify the pulsed laser light output from the laser light source, change a pulse width of the pulsed laser light, and output the pulsed laser light,
wherein the pulse width control unit includes
a first laser amplifier configured to amplify the pulsed laser light and
a pulse waveform manipulation unit disposed between the first laser amplifier and the laser light source and configured to manipulate a pulse waveform of the pulsed laser light, and
wherein the laser light source outputs multi-mode pulsed laser light, and
the pulse width control unit includes
a mode selection unit configured to select one of multi-modes between the laser light source and the pulse waveform manipulation unit.

11. The laser device according to claim 6,
wherein the pulse waveform manipulation unit is configured to adjust at least one of a rise time and a fall time of the pulsed laser light.

12. The laser device according to claim 11,
wherein the pulse waveform manipulation unit is configured to adjust tr/tf in a range of more than 0 and less than 1 when a rise time of the pulsed laser light is tr and a fall time of the pulsed laser light is tf.

13. The laser device according to claim 12,
wherein the pulse waveform manipulation unit is configured to adjust tr/tf to less than 0.85.

14. The laser device according to claim 6,
wherein the pulse waveform manipulation unit is configured to manipulate a waveform of the pulsed laser light while maintaining a pulse width of the pulsed laser light.

15. The laser device according to claim 7,
wherein the pulse waveform manipulation unit is configured to adjust at least one of a rise time and a fall time of the pulsed laser light.

16. The laser device according to claim 15,
wherein the pulse waveform manipulation unit is configured to adjust tr/tf in a range of more than 0 and less than 1 when a rise time of the pulsed laser light is tr and a fall time of the pulsed laser light is tf.

17. The laser device according to claim 16,
wherein the pulse waveform manipulation unit is configured to adjust tr/tf to less than 0.85.

18. The laser device according to claim 7,
wherein the pulse waveform manipulation unit is configured to manipulate a waveform of the pulsed laser light while maintaining a pulse width of the pulsed laser light.

19. The laser device according to claim 9,
wherein the pulse waveform manipulation unit is config-
ured to adjust at least one of a rise time and a fall time
of the pulsed laser light.

20. The laser device according to claim 19,
wherein the pulse waveform manipulation unit is config-
ured to adjust tr/tf in a range of more than 0 and less
than 1 when a rise time of the pulsed laser light is tr and
a fall time of the pulsed laser light is tf.

21. The laser device according to claim 20,
wherein the pulse waveform manipulation unit is config-
ured to adjust tr/tf to less than 0.85.

22. The laser device according to claim 9,
wherein the pulse waveform manipulation unit is config-
ured to manipulate a waveform of the pulsed laser light
while maintaining a pulse width of the pulsed laser
light.

23. The laser device according to claim 10,
wherein the pulse waveform manipulation unit is config-
ured to adjust at least one of a rise time and a fall time
of the pulsed laser light.

24. The laser device according to claim 23,
wherein the pulse waveform manipulation unit is config-
ured to adjust tr/tf in a range of more than 0 and less
than 1 when a rise time of the pulsed laser light is tr and
a fall time of the pulsed laser light is tf.

25. The laser device according to claim 24,
wherein the pulse waveform manipulation unit is config-
ured to adjust tr/tf to less than 0.85.

26. The laser device according to claim 10,
wherein the pulse waveform manipulation unit is config-
ured to manipulate a waveform of the pulsed laser light
while maintaining a pulse width of the pulsed laser
light.

* * * * *